(12) United States Patent
Luo

(10) Patent No.: US 11,327,350 B2
(45) Date of Patent: May 10, 2022

(54) FLEXIBLE LIQUID-CRYSTAL-SCREEN MODULE AND METHOD OF ASSEMBLING THE SAME

(71) Applicant: VIVO MOBILE COMMUNICATION CO., LTD., Guangdong (CN)

(72) Inventor: Peng Luo, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/766,244

(22) PCT Filed: Nov. 12, 2018

(86) PCT No.: PCT/CN2018/115010
§ 371 (c)(1),
(2) Date: May 21, 2020

(87) PCT Pub. No.: WO2019/100961
PCT Pub. Date: May 31, 2019

(65) Prior Publication Data
US 2021/0033913 A1    Feb. 4, 2021

(30) Foreign Application Priority Data

Nov. 22, 2017    (CN) .......................... 201711174361.8

(51) Int. Cl.
*G02F 1/1333*    (2006.01)
*F21V 8/00*    (2006.01)
*G02F 1/1335*    (2006.01)

(52) U.S. Cl.
CPC ..... *G02F 1/133308* (2013.01); *G02B 6/0053* (2013.01); *G02B 6/0055* (2013.01);
(Continued)

(58) Field of Classification Search
None
See application file for complete search history.

(56) References Cited

U.S. PATENT DOCUMENTS

2004/0207773 A1    10/2004 Kao
2007/0273808 A1    11/2007 Hsu et al.
(Continued)

FOREIGN PATENT DOCUMENTS

CN    102654660 A    9/2012
CN    102736278 A    10/2012
(Continued)

OTHER PUBLICATIONS

Chinese Office Action issued in corresponding application No. 201711174361.8, dated May 13, 2019.
(Continued)

*Primary Examiner* — Phu Vu
(74) *Attorney, Agent, or Firm* — Maschoff Brennan

(57) ABSTRACT

A flexible liquid-crystal-screen module and a method of assembling the flexible liquid-crystal-screen module are provided. The flexible liquid-crystal-screen module includes a groove-type middle bezel, a flexible liquid-crystal display and a backlight assembly, wherein, the backlight assembly is fixed at a bottom of a groove of the groove-type middle bezel, the flexible liquid-crystal display is fixed on an opening of the groove of the groove-type middle bezel, and the backlight assembly is spaced from the flexible liquid-crystal display.

7 Claims, 2 Drawing Sheets

(52) U.S. Cl.
CPC .. *G02F 1/133305* (2013.01); *G02F 1/133528* (2013.01); *G02F 1/133317* (2021.01); *G02F 1/133325* (2021.01); *G02F 1/133331* (2021.01)

(56) References Cited

U.S. PATENT DOCUMENTS

| | | | |
|---|---|---|---|
| 2011/0043719 A1* | 2/2011 | Thunhorst | G02F 1/133608 349/58 |
| 2011/0141765 A1* | 6/2011 | Chang | G02B 5/045 362/606 |
| 2014/0120275 A1 | 5/2014 | Lu et al. | |
| 2014/0133073 A1 | 5/2014 | Ahn et al. | |
| 2015/0070826 A1* | 3/2015 | Montevirgen | G06F 1/1656 361/679.26 |
| 2015/0261033 A1* | 9/2015 | Shin | G06F 1/1656 349/58 |
| 2016/0259203 A1 | 9/2016 | Nishimoto et al. | |
| 2016/0291391 A1* | 10/2016 | Yoshida | G02F 1/133308 |
| 2017/0235183 A1 | 8/2017 | Chen et al. | |
| 2018/0039052 A1* | 2/2018 | Khan | G02B 27/283 |
| 2018/0106958 A1 | 4/2018 | Zeng et al. | |
| 2019/0171060 A1* | 6/2019 | Chen | G02F 1/133512 |

FOREIGN PATENT DOCUMENTS

| | | |
|---|---|---|
| CN | 202955582 U | 5/2013 |
| CN | 103810942 A | 5/2014 |
| CN | 104914610 A | 9/2015 |
| CN | 105161004 A | 12/2015 |
| CN | 105182591 A | 12/2015 |
| CN | 205193388 U | 4/2016 |
| CN | 205301760 U | 6/2016 |
| CN | 105785624 A | 7/2016 |
| CN | 105911757 A | 8/2016 |
| CN | 105938265 A | 9/2016 |
| CN | 205581459 U | 9/2016 |
| CN | 206039084 U | 3/2017 |
| CN | 107797325 A | 3/2018 |
| EP | 2 916 165 A1 | 9/2015 |
| JP | 2010266603 A | 11/2010 |
| TW | 200422712 A | 11/2004 |

OTHER PUBLICATIONS

PCT International Search Report and Written Opinion issued in corresponding application No. PCT/CN2018/115010, dated Jun. 4, 2020.

EP Search Report in Application No. 18881667.2 dated Dec. 8, 2020.

* cited by examiner

FLEXIBLE LIQUID-CRYSTAL-SCREEN MODULE AND METHOD OF ASSEMBLING THE SAME

CROSS-REFERENCE TO RELATED APPLICATION

The present disclosure is a U.S. national phase application of a PCT Application No. PCT/CN2018/115010 filed on Nov. 12, 2018, which claims priority to Chinese patent application No. 201711174361.8, filed in China on Nov. 22, 2017, the disclosures of which are incorporated herein by reference in their entirety.

TECHNICAL FIELD

The present disclosure relates to the field of hardware, in particular to a flexible liquid-crystal-screen module and a method of assembling the flexible liquid-crystal-screen module.

BACKGROUND

With development of the manufacturing industry, a hardware technology level of a terminal is rapidly improved, for example, a size of a screen of a mobile terminal is larger, and a bezel (a distance between an edge of the screen and an outer bezel of the terminal) is narrower, which benefits from improvement of a production and an assembly technology of a screen module. Especially, reducing a size of the bezel to improve a visual perception of a user becomes a focus for developing a screen module technology in recent years.

A liquid-crystal-screen module in related art is shown in FIG. 1. A liquid-crystal-screen module 10 includes a cover plate/a touch screen 101, an optical adhesive 102, an upper polarizer 103, a lower polarizer 106, an upper glass sheet 104 and a lower glass sheet 105. A backlight assembly 11 is arranged below the lower polarizer 106, wherein the backlight assembly 11 includes a light-shielding adhesive 107, a support 114, a backlight reflecting sheet 112 bonded below the support, a backlight light-guide plate 111, a backlight diffusing film 110, and an upper backlight brightness-enhancement film 108 and a lower backlight brightness-enhancement film 109, wherein the backlight light-guide plate 111 is assembled above the backlight reflecting sheet 112. That is, the liquid-crystal-screen module 10 and the backlight module 11 are adhered together and lapped on an opening of a groove-type middle bezel 116.

It can be seen that since the backlight light-guide plate 111 needs to be assembled above the backlight reflecting sheet 112, the support 114 is required to play a support function, and the support 114 can be adhered to the backlight reflecting sheet 112 by a double-sided adhesive tape. The presence of the support inevitably occupies a certain space, and thus affects the area of the backlight assembly 11. Usually, a certain gap 115 is also pre-provided between the backlight assembly 11 and the groove-type middle bezel 116; an adhesive 113 is provided between the cover plate/touch screen and the groove-type middle bezel, and therefore, the area of the backlight assembly 11 is further affected. As shown in FIG. 1, the area of the backlight assembly 11 directly affects an area of contents displayed by the cover plate/touch screen. A small area of contents displayed by a liquid-crystal display in the related art may be resulted, thereby making it difficult to manufacture a bezel having a narrower appearance. Also, since the backlight light-guide plate 111 which is in the backlight assembly 11 currently bonded with the liquid-crystal display 10 cannot be bent, display by a flexible liquid-crystal display cannot be realized.

SUMMARY

In a first aspect, a flexible liquid-crystal-screen module is provided in the embodiments of the present disclosure. The flexible liquid-crystal-screen module includes a groove-type middle bezel, a flexible liquid-crystal display and a backlight assembly, wherein the backlight assembly is fixed at a bottom of a groove of the groove-type middle bezel; the flexible liquid-crystal display is fixed on an opening of the groove of the groove-type middle bezel, and the backlight assembly is spaced from the flexible liquid-crystal display.

In a second aspect, a method of assembling a flexible liquid-crystal-screen module is provided in the embodiments of the present disclosure. The method includes fitting a backlight assembly at a bottom of a groove of a middle bezel; lapping a flexible liquid-crystal display on an opening of the groove of the groove-type middle bezel, the backlight assembly and the flexible liquid-crystal display being spaced from each other.

BRIEF DESCRIPTION OF THE DRAWINGS

Accompanying drawings provided herein are used to provide a further understanding of the present disclosure and constitute a part of the present disclosure. Illustrative embodiments of the present disclosure are used to explain the present disclosure, but do not limit the present disclosure. In the drawings.

DETAILED DESCRIPTION

The technical solutions in the embodiments of the present disclosure will be clearly and completely described below with reference to the drawings in the embodiments of the present disclosure, and it is obvious that the described embodiments are a part, rather than all, of the embodiments of the present disclosure. All other embodiments which can be obtained by a person skilled in the art without paying any creative effort based on the embodiments in the present disclosure belong to the protection scope of the present disclosure.

The technical solutions provided by the embodiments of the present disclosure are described in detail below with reference to the accompanying drawings.

Figure 1:
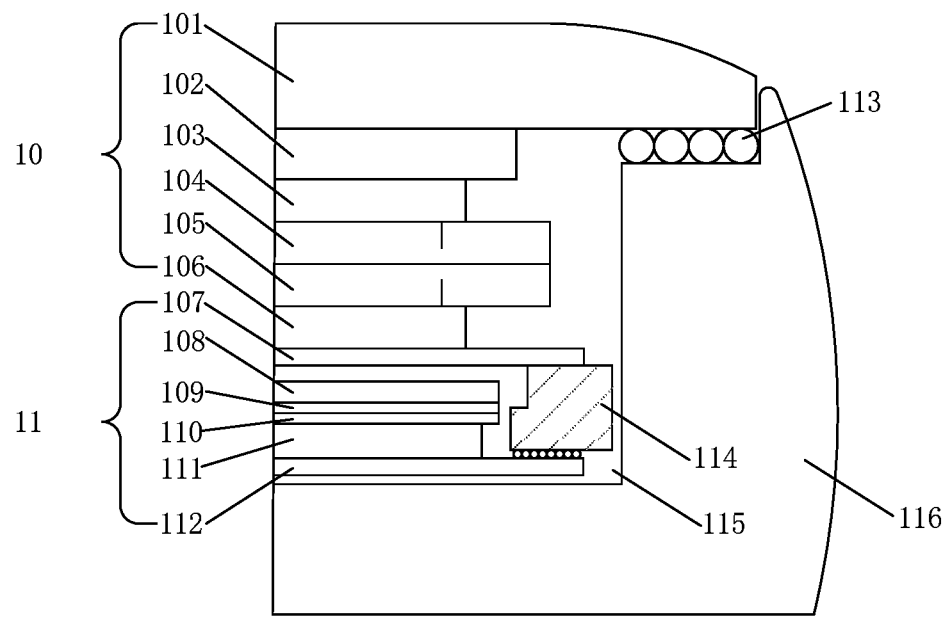
FIG. 1 is a semi-sectional view of a liquid-crystal-screen module structure in the related art.
Figure 2:
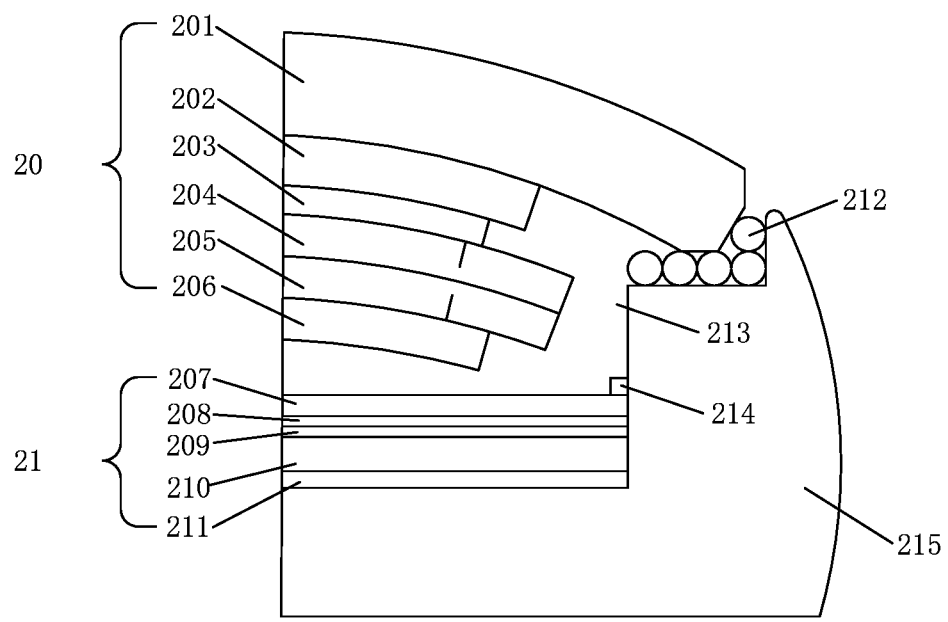
FIG. 2 is a semi-sectional view of a flexible liquid-crystal-screen module structure according to an embodiment of the present disclosure.

As shown in FIG. 2, the embodiment provides a flexible liquid-crystal-screen module to solve the problem in the related art that the liquid-crystal-screen module in the related art cannot display using a flexible liquid-crystal and an area of the contents that can be displayed is not large, and it is difficult to make the bezel look narrower in a visual effect. This flexible liquid-crystal-screen module includes: a groove-type middle bezel 215, a flexible liquid-crystal display 20, and a backlight assembly 21, wherein, the backlight assembly 21 may be fixed at the bottom of a groove of the groove-type middle bezel 215; the flexible liquid-crystal display 20 may be fixed to an opening of the groove of the groove-type middle bezel 215, and the backlight assembly 21 and the flexible liquid-crystal display 20 may be spaced apart from each other to form a gap 213.

A backlight assembly (Back Light) is an assembly located behind a liquid-crystal display (LCD), and a lighting effect of the backlight assembly directly affects a visual effect of the liquid-crystal display. The liquid-crystal display itself does not emit light, but can display a graphic or a modulation result of light modulated by the liquid-crystal display.

Specifically, the backlight assembly 21 may be fixed to the bottom of the groove of middle bezel 215 by an adhesive 214, and the flexible liquid-crystal display 20 may be fixed to the opening of the groove of the groove-type middle bezel 215 by an adhesive 212, so that the backlight assembly 21 and the flexible liquid-crystal display 20 may be separated from each other without structurally interfering with each other.

In an embodiment, the flexible liquid-crystal display 20 may include a curved-surface cover plate (touch screen) 201, an optical adhesive 202, and an assembly of a curved-surface polarizer and a curved-surface glass, stacked in sequence from top to bottom.

Further, the assembly including the curved-surface polarizer and the curved-surface glass may include, from top to bottom, a curved-surface upper polarizer 203, a curved-surface upper glass 204, a curved-surface lower glass 205, and a curved-surface lower polarizer 206, stacked sequentially. The glass herein can be a liquid-crystal glass which also called an electric control liquid-crystal glass, or an electric control switchable glass, or a switchable glass; the polarizer can be a polaroid, an imaging by a liquid-crystal display must depend on polarized light, and the liquid-crystal display can be provided with a front polaroid and a rear polaroid which are tightly attached to the liquid-crystal glass.

In an embodiment, the backlight assembly 21 may include a backlight reflecting sheet 211, a backlight light-guide plate 210, a backlight diffusing film 209, and a backlight brightness-enhancement film, which are stacked sequentially from bottom to top. The backlight reflecting sheet can reflect light through a back surface of the backlight reflecting sheet. The light-guide plate may be a plate formed of a material of optical acrylic/Poly Carbonate (PC) which has very high reflectivity and does not absorb light; the plate formed of the material may receive light emitted from a lamp and reflect the light, reflected light may be diffused at various angle, and then a reflection condition may be destroyed and the diffused light is emitted from a front surface of the light-guide plate. The diffusing film may refer to a film applied to a backlight assembly. The brightness-enhancement film may be a film or sheet that is applied to the backlight assembly to improve a luminous efficiency.

It should be noted that, in practical applications, a light bar, such as an LED light bar, may be additionally installed at a horizontal parallel position of the backlight light-guide plate 210.

Further, the backlight brightness-enhancement film may include: a backlight lower brightness-enhancement film 208 and a backlight upper brightness-enhancement film 207.

According to the flexible liquid-crystal-screen module provided by the embodiment, the backlight assembly 21 and the flexible liquid-crystal display 20 are spaced from each other, and the backlight assembly 21 is fixed at the bottom of the groove of the groove-shaped middle bezel 215, so that a support in the related art is not required any long to support the backlight assembly 21 and the flexible liquid-crystal display 20 in order to connect the backlight assembly 21 and the flexible liquid-crystal display 20, but the groove-type middle bezel 215 is directly utilized to implement a support function. The area of the backlight assembly 21 is increased under a condition that the size of the groove-type middle bezel is not changed because the support 114 is not required. Moreover, since the backlight component 21 and the liquid-crystal display are spaced from each other, a condition that the liquid-crystal display is unbendable due to limitation of the backlight assembly is eliminated, a planar liquid-crystal display can be replaced by the flexible liquid-crystal display 20 having a curved-surface, display through the flexible liquid-crystal-screen module can be realized on the terminal, and the area of the backlight assembly 21 is increased. Thus, on basis of realizing the flexible liquid-crystal display, the display area which may display contents by the liquid-crystal display is increased, and accordingly, the bezel looks narrower in terms of a display effect.

Figure 3:
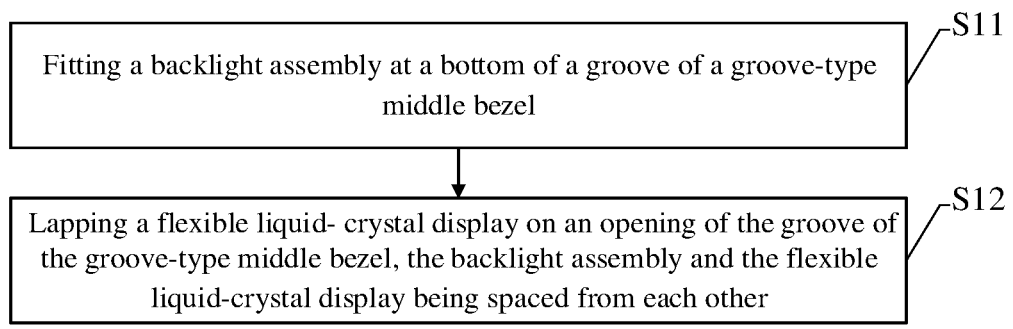
FIG. 3 is a schematic flow chart illustrating a method of assembling a flexible liquid-crystal-screen module according to an embodiment of the present disclosure.

Corresponding to the above embodiment, this embodiment provides a method of assembling a flexible liquid-crystal-screen module, so as to solve the problem that a liquid-crystal-screen module in the related art cannot display through a flexible liquid-crystal display and the area of the displayed contents is not large, and a display effect of a bezel is difficult to be made narrower. The flow of the method is schematically shown in FIG. 3, and may include the following steps S11-S12.

Step S11: fitting the backlight assembly 21 at a bottom of a groove of the groove-type middle bezel.

Step S12: lapping the flexible liquid-crystal display 20 on an opening of the groove of the groove-type middle bezel, the backlight assembly and the flexible liquid-crystal display being spaced from each other.

As shown in FIG. 2, the backlight assembly 21 may be fitted at the bottom of the groove of the groove-type middle bezel 215, the backlight assembly 21 may be fitted at and fixed at the bottom of the groove of the groove-type middle bezel 215 by using the adhesive 214 or a double-sided adhesive tape, and the flexible liquid-crystal display 20 may be lapped on an opening of the groove of the groove-type middle bezel, such that a certain gap exists between the backlight assembly and the flexible liquid-crystal display.

Specifically, fitting the backlight assembly 21 at the bottom of the groove of the groove-type middle bezel may include: stacking, sequentially from bottom to top at the bottom of the groove of the groove-type middle bezel 215, the backlight reflecting sheet 211, the backlight light-guide plate 210, the backlight diffusing film 209, and the backlight brightness-enhancement film.

It should be noted that, in practical applications, a light bar may be additionally installed at a horizontal parallel position of the backlight light-guide plate 210, for example, the light bar may be an LED (Light Emitting Diode) light bar.

Further, the backlight lower brightness-enhancement film 208 and the backlight upper brightness-enhancement film 207 may be stacked in this order from bottom to top when the backlight brightness-enhancement film is fitted.

Specifically, a method of assembling the flexible liquid-crystal display 20 may be: stacking sequentially, at the bottom of the curved-surface cover plate 201, the optical adhesive 202 and an assembly of the curved-surface polarizer and the curved-surface glass.

Further, stacking sequentially the optical adhesive 202 and the assembly of the curved-surface polarizer and the curved-surface glass may include: sequentially stacking the optical adhesive 202, the curved-surface upper polarizer 203, the curved-surface upper glass 204, the curved-surface lower glass 205, and the curved-surface lower polarizer 206.

According to the method of assembling the flexible liquid-crystal-screen module provided by the embodiment, the backlight assembly 21 and the flexible liquid-crystal display 20 are spaced from each other, and the backlight assembly 21 is fixed at the bottom of the groove of the groove-shaped middle bezel 215, so that a support in the related art is not required any long to support the backlight assembly 21 and the flexible liquid-crystal display 20 in order to connect the backlight assembly 21 and the flexible liquid-crystal display 20, but the groove-type middle bezel 215 is directly utilized to implement a support function. The area of the backlight assembly 21 is increased under a condition that the size of the groove-type middle bezel is not changed because the support 114 is not required. Moreover, since the backlight component 21 and the liquid-crystal display are spaced from each other, a condition that the liquid-crystal display is unbendable due to limitation of the backlight assembly is eliminated, a planar liquid-crystal display can be replaced by the flexible liquid-crystal display 20 having a curved-surface surface, display through the flexible liquid-crystal-screen module can be realized on the terminal, and the area of the backlight assembly 21 is increased. Thus, on basis of realizing the flexible liquid-crystal display, the display area which may display contents by the liquid-crystal display is increased, and accordingly, the bezel looks narrower in terms of a display effect.

In the present disclosure, the flexible liquid-crystal-screen module and the method of assembling the flexible liquid-crystal-screen module can be applied to all devices requiring installation of the flexible liquid-crystal-screen module, such as mobile phones, tablet computers, and the like.

The above description are only embodiments of the present disclosure and is not intended to limit the present disclosure. Various modifications and variations of the present disclosure will occur to those skilled in the art. Any modification, equivalent replacement, improvement or the like made within the principle of the present disclosure should be included in the scope of the claims of the present disclosure.

What is claimed is:

1. A flexible liquid-crystal-screen module, comprising:
a groove-type middle bezel, a flexible liquid-crystal display and a backlight assembly, wherein,
the groove-type middle bezel comprises a bottom part and a side part connected to the bottom part, and the bottom part and the side part enclose a groove of the groove-type middle bezel;
the backlight assembly is fixed at the bottom part of the groove-type middle bezel, and the bottom part is configured to support the backlight assembly;
the flexible liquid-crystal display is fixed on an opening of the groove of the groove-type middle bezel through a first adhesive, and the side part is configured to support the flexible liquid-crystal display; wherein the side part is of an integral structure, and comprises a top surface orthogonally crossing an inner side surface of the groove of the groove-type middle bezel, the flexible liquid-crystal display comprises a touch screen curved in a convex direction away from the bottom part, the touch screen is fixed on the top surface of the side part through the first adhesive, and an orthogonal projection of the touch screen onto a same plane falls into an orthogonal projection of the groove-type middle bezel onto the same plane;
the backlight assembly is spaced from the flexible liquid-crystal display,
the backlight assembly comprises a backlight reflecting sheet, a backlight light-guide plate, a light bar, a backlight diffusing film and a backlight brightness-enhancement film stacked sequentially,
the backlight assembly is fixed at the bottom of the groove of the groove-type middle bezel through a second adhesive, and
a lateral side of the backlight assembly directly contacts with the inner side surface of the groove of the groove-type middle bezel.

2. The flexible liquid-crystal-screen module according to claim 1, wherein, the flexible liquid-crystal display comprises a curved-surface cover plate, an optical adhesive, and an assembly of a curved-surface polarizer and a curved-surface glass, and the curved-surface cover plate, the optical adhesive, and the assembly of the curved-surface polarizer and the curved-surface glass are stacked sequentially.

3. The flexible liquid-crystal-screen module according to claim 2, wherein the assembly of the curved-surface polarizer and the curved-surface glass comprises a curved-surface upper polarizer, a curved-surface upper glass, a curved-surface lower glass, and a curved-surface lower polarizer stacked sequentially.

4. The flexible liquid-crystal-screen module according to claim 2, wherein the backlight brightness-enhancement film comprises a backlight lower brightness-enhancement film and a backlight upper brightness-enhancement film stacked sequentially.

5. A method of assembling a flexible liquid-crystal-screen module, comprising:
fitting a backlight assembly at a bottom part of a groove-type middle bezel; wherein the groove-type middle bezel comprises the bottom part and a side part connected to the bottom part, and the bottom part and the side part enclose a groove of the groove-type middle bezel;
fixing the backlight assembly at the bottom part of the groove-type middle bezel through a second adhesive;
lapping and fixing a flexible liquid-crystal display on an opening of the groove of the groove-type middle bezel through a first adhesive, wherein the side part is configured to support the flexible liquid-crystal display, and the backlight assembly and the flexible liquid-crystal display are spaced from each other, wherein the side part is of an integral structure, and comprises a top surface orthogonally crossing an inner side surface of the groove of the groove-type middle bezel, the flexible liquid-crystal display comprises a touch screen curved in a convex direction away from the bottom part, the touch screen is fixed on the top surface of the side part through the first adhesive, and an orthogonal projection of the touch screen onto a same plane falls into an orthogonal projection of the groove-type middle bezel onto the same plane;
wherein fitting the backlight assembly at the bottom of the groove of the groove-type middle bezel, comprises: sequentially stacking a backlight reflecting sheet, a backlight light-guide plate, a light bar, a backlight diffusing film, and a backlight brightness-enhancement film on the bottom of the groove of the groove-type middle bezel,
a lateral side of the backlight assembly directly contacts with the inner side surface of the groove of the groove-type middle bezel.

6. The method according to claim 5, wherein, before lapping the flexible liquid-crystal display on the opening of the groove of the groove-type middle bezel, the method further comprises stacking sequentially an optical adhesive and an assembly of a curved-surface polarizer and a curved-surface glass at a bottom of a curved cover plate, to fabricate the flexible liquid crystal display.

7. The method according to claim 6, wherein, stacking sequentially the optical adhesive and the assembly of the curved-surface polarizer and the curved-surface glass at the bottom of the curved cover plate further comprises: sequentially stacking an optical adhesive, a curved-surface upper polarizer, a curved-surface upper glass, a curved-surface lower glass, and a curved-surface lower polarizer.

\* \* \* \* \*